US008661674B1

(12) United States Patent
Metz

(10) Patent No.: US 8,661,674 B1
(45) Date of Patent: Mar. 4, 2014

(54) METHOD OF REPAIRING A FURNACE

(76) Inventor: Michael P. Metz, Elgin, IL (US)

( * ) Notice: Subject to any disclaimer, the term of this patent is extended or adjusted under 35 U.S.C. 154(b) by 549 days.

(21) Appl. No.: 12/928,610

(22) Filed: Dec. 15, 2010

(51) Int. Cl.
  *B23P 6/00* (2006.01)
  *B23P 15/26* (2006.01)
  *F16L 55/18* (2006.01)

(52) U.S. Cl.
  USPC .............. 29/890.031; 29/890.053; 29/402.01; 29/402.03; 29/402.08; 29/469; 29/525; 29/525.01; 29/525.14; 138/97; 285/15

(58) Field of Classification Search
  USPC ......... 29/890.03, 890.031, 890.043, 890.053, 29/401.1, 402.01, 402.03, 402.04, 402.05, 29/402.06, 402.08, 402.09, 402.11, 29/402.12, 402.13, 402.14, 469, 525, 29/525.01, 525.14; 285/15; 138/97, 98, 138/99; 165/76
  See application file for complete search history.

(56) References Cited

U.S. PATENT DOCUMENTS

| | | | |
|---|---|---|---|
| 1,946,734 A | 2/1934 | Price | |
| 2,537,678 A * | 1/1951 | Koetting | 165/157 |
| 2,679,681 A | 6/1954 | Resler | |
| 2,823,049 A * | 2/1958 | Hombach | 285/31 |
| 3,285,318 A | 11/1966 | Keinonen et al. | |
| 3,504,515 A | 4/1970 | Reardon | |
| 3,807,024 A * | 4/1974 | Harvey et al. | 29/402.13 |
| 4,049,762 A | 9/1977 | Martino et al. | |
| 4,229,869 A * | 10/1980 | Wendt et al. | 29/890.031 |
| 4,385,514 A | 5/1983 | Sassak | |
| 4,505,261 A * | 3/1985 | Hunter | 126/635 |
| 5,042,453 A | 8/1991 | Shellenberger | |
| 5,452,921 A | 9/1995 | Hyatt et al. | |
| 6,596,957 B2 * | 7/2003 | Gandy et al. | 219/61 |
| 6,976,710 B1 * | 12/2005 | Bedford | 285/15 |
| 7,578,161 B1 | 8/2009 | Sizemore | |
| 8,127,799 B2 * | 3/2012 | Cortez | 138/97 |
| 2002/0040777 A1 | 4/2002 | Tomlinson et al. | |
| 2010/0011833 A1 | 1/2010 | Sizemore | |
| 2010/0133804 A1 * | 6/2010 | Larkin | 285/16 |

FOREIGN PATENT DOCUMENTS

| | | | | |
|---|---|---|---|---|
| JP | 02099273 A * | 4/1990 | | F28F 11/00 |
| WO | WO 87/02763 | 5/1987 | | |
| WO | WO 9910696 A1 * | 3/1999 | | F28F 1/00 |

\* cited by examiner

*Primary Examiner* — Sarang Afzali
(74) *Attorney, Agent, or Firm* — Mathew R. P. Perrone, Jr.; Mark J. Hanson

(57) ABSTRACT

A furnace repair device and method therefore is accomplished by including pipe of suitable length and strength to have at least one swedged end permitting assembly in female to male relationship, which permits a proper securing of the replacement pipe in a desired position in the heat exchanger.

5 Claims, 6 Drawing Sheets

METHOD OF REPAIRING A FURNACE

This invention relates to a furnace repair device and method and more particularly to a furnace repair device and method suitable for repairing the heat exchanger of a furnace to at least lengthen a useful life of the furnace rolled.

BACKGROUND OF THE INVENTION

Every furnace has a useful life. Customarily, when the end of that useful life at least becomes close, that furnace must be replaced. In that case, the cost of the new furnace becomes a serious consideration. When the furnace is used on a commercial style building, the increased size of the furnace required to heat such a building greatly adds to the cost of the furnace. Thus, to replace that furnace requires that a great expense be incurred. It thus becomes a clear advantage to determine whether the furnace can be repaired efficiently or not.

The major problem with a furnace is the heat exchanger. The heat exchanger consists of the series of tubes, which carry air past a heating device, to form heated air and ultimately warm a desired area. The tubes of a heat exchanger are arranged in series of 180 degree arcs to save space and provide for more efficient heating. Yet it is at the arcs that corrosion and other defects are most likely to occur. Those defects require replacement of the furnace under current conditions.

More particularly, those defects form undesired apertures in the heat exchanger, thereby leading to at least an undesirable, if not deadly concentration of carbon monoxide or other undesired gases in areas required for human use. When such defects occur, an efficient repair is much more cost effective than a complete replacement of the furnace or heat exchanger.

The furnace repair device and method must also be adaptable to the size of the furnace needing repair. It is known to be difficult to find an appropriate size furnace repair device and method for a commercial furnace or a residential furnace. A commercial furnace repair system is most valuable, yet the most difficult system to achieve.

SUMMARY OF THE INVENTION

Among the many objectives of the present invention is the provision of a furnace repair device and method, which easily repairs a furnace.

Another objective of the present invention is the provision of a furnace repair device and method, which provides durability to a furnace.

Also, an objective of the present invention is the provision of a furnace repair device and method, which easily repairs a commercial furnace.

Moreover, an objective of the present invention is the provision of a furnace repair device and method, which easily repairs a residential furnace.

A further objective of the present invention is the provision of a furnace repair device and method, which can be manufactured in a desired size.

A still further objective of the present invention is the provision of a furnace repair device and method, which can effectively replace a defect in a 180 arc of a furnace heat exchange pipe.

Yet a further objective of the present invention is the provision of a furnace repair device and method, which can avoid an undesirable collection of gas.

Also, an objective of the present invention is the provision of a furnace repair device and method, which can effectively replace a defect in a furnace heat exchange pipe.

Moreover, another objective of the present invention is the provision of a furnace repair device and method which can save time and money during the installation process.

These and other objectives of the invention (which other objectives become clear by consideration of the specification, claims and drawings as a whole) are met by providing a furnace repair device and method including a pipe of suitable length and strength to have at least one swedged end permitting assembly in a female to male relationship, which permits a proper securing of the replacement pipe in a desired position.

BRIEF DESCRIPTION OF DRAWINGS

Throughout the figures of the drawings, where the same part appears in more than one figure of the drawings, the same number is applied thereto.

DESCRIPTION OF THE PREFERRED EMBODIMENTS

Figure 1:
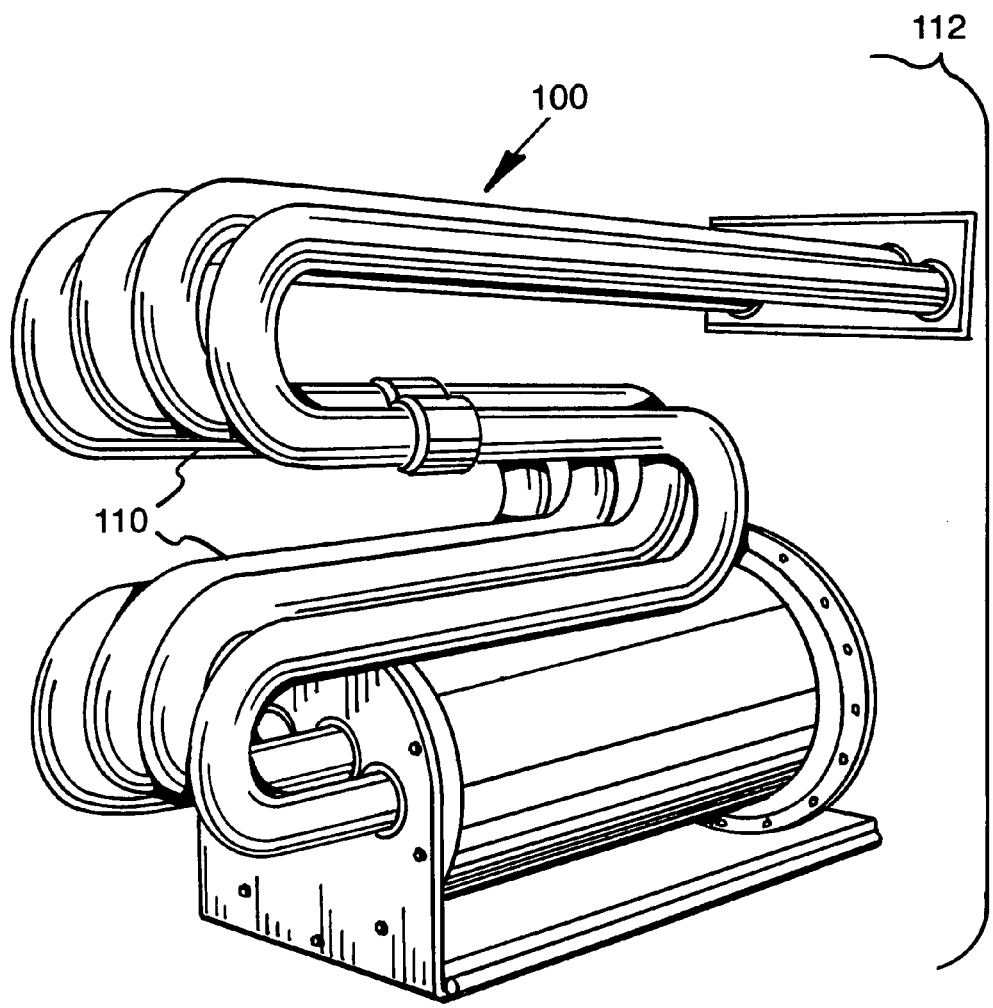
FIG. 1 depicts a perspective view of the furnace repair device 100 of this invention in use on a repaired heat exchanger 110 for a furnace 112.

Reference will now be made in detail to several embodiments of the invention that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar to directional terms are not to be construed to limit the scope of the invention in any manner. The words attach, connect, couple, and similar terms with their inflectional morphemes do not necessarily denote direct or intermediate connections, but may also include connections through mediate elements or devices.

With the furnace repair device and method of this invention, there is a swedged pipe used to replace a damaged section of defective pipe in a heat exchanger. By swedged is meant that the pipe has at least one expanded swedged end. Into the swedged end may fit another pipe, with swedged pipe forming the female part of female to male relation. The swedged end is of sufficient diameter to receive the pipe so securely and tightly and strongly to form an air tight joint, preferably due to welding, epoxy, clamping, physical interference whereby the two parts are mechanical seized or bonded together (friction), or any other appropriate securing system.

With the furnace repair device of this invention, the cost to repair the heat exchanger and make the environment safe for humans, is about one quarter of the cost of replacing the entire furnace and heat exchanger combination. The furnace and heat exchanger are sold as a single unit so if the furnace is working it must be replaced to repair the heat exchanger. Thus, the furnace repair device of this invention saves a great amount of money.

Furthermore, due to the size and weight of a combination of the furnace and heat exchanger, it takes at least two people and a crane to get the furnace and heat exchanger to the roof of a building and installed properly. With the subject of this invention, the replacement of pipes with damage or apertures is greatly simplified. A single technician can carry the replacement pipes on the ladder and get them to the roof of a building. Thus, the heat exchanger repair system of this invention eliminates the need for a second technician and a crane which saves the client money.

Moreover, due to the simplicity of the heat exchanger repair system of this invention, the time it takes to replace the unit is greatly reduced. A technician can replace the damaged pipes in about half the time it takes to replace the entire combination of a furnace and heat exchanger unit. Also, the repair can be performed while the building is still in operation. For commercial applications, the business can continue to conduct its regular duties while the heat exchanger is being repaired. The old method of changing the furnace and heat exchanger unit requires that the building be out of commission while the repair is being performed. Thus, the heat exchanger repair of this invention saves the client further money and the repair process is quicker and more efficient.

Finally, the heat exchanger repair system of this invention can be used on commercial, residential, or any type of structure that has a heat exchanger. Thus, the heat exchanger repair system of this invention has a broad versatility and can be used on many applications. Thus, the flexibility of the heat exchanger repair system of this invention provides great flexibility.

Referring now to FIG. 1, the furnace repair device 100 of this invention can be seen in use on a repaired heat exchanger 110 for a furnace 112. More particularly single swedged arced pipe 140 (See FIG. 3) is used to repair the heat exchanger 110.

Figure 2:
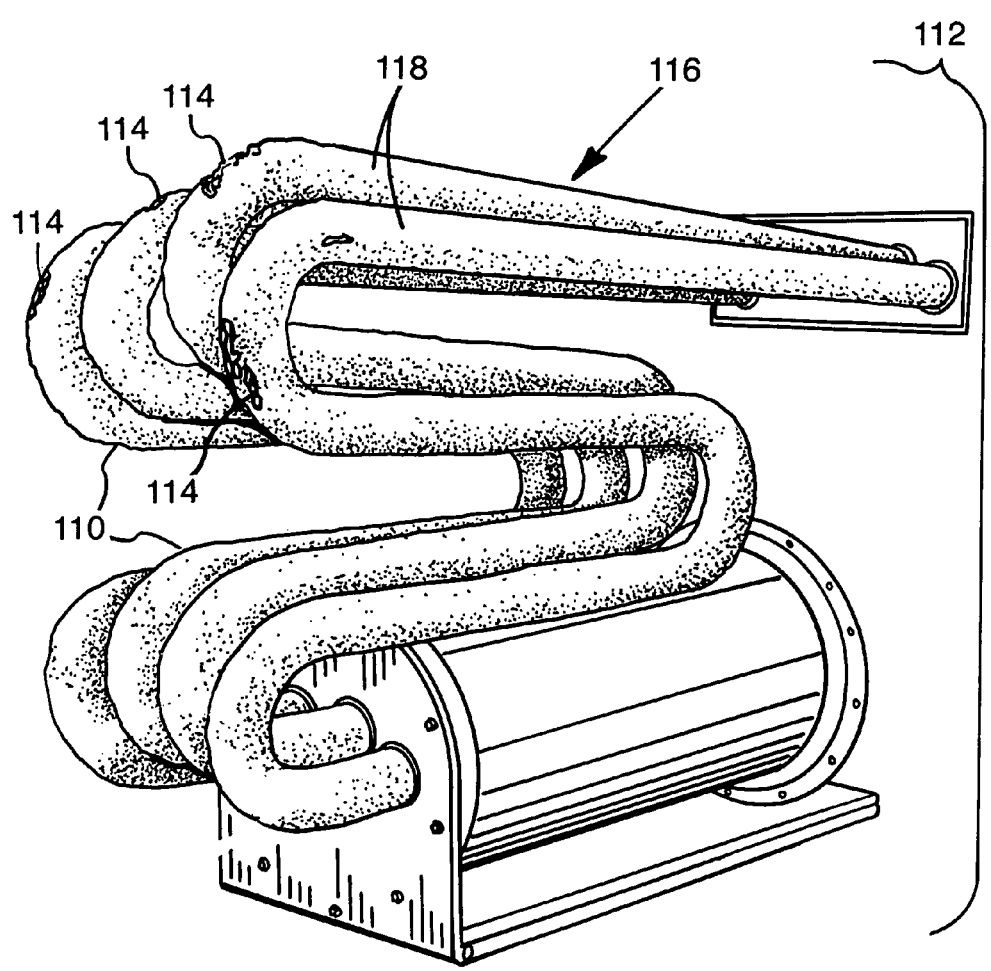
FIG. 2 depicts a perspective view of a heat exchanger 110 for a furnace 112 before repair.

Turning now to FIG. 2, heat exchanger 110 for a furnace 112 needs repair due to presence of cracks 114 in original pipes 116. Cracks 114 herein can refer to any opening, which compromises the integrity of any original pipe 116. An appropriate length of original pipes 116 sufficient to permit insertion of swedged arced pipe 140 in place of the length, is cut from the original pipe 116 and replaced with a swedged arced pipe 140. To complete this repair, the original pipes 116 will become removed parts 118 and replaced with a swedged arced pipe 140 (See FIG. 3).

Figure 3:
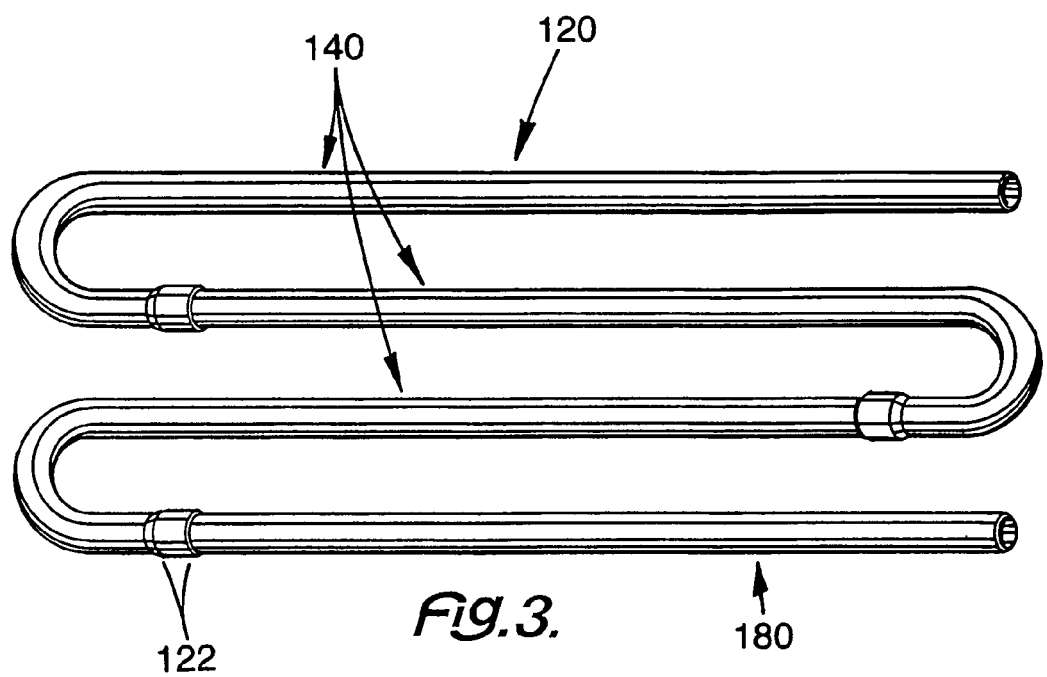
FIG. 3 depicts a perspective view of the swedged pipe assembly 120 suitable for use in the repair of heat exchanger 110.
Figure 4:
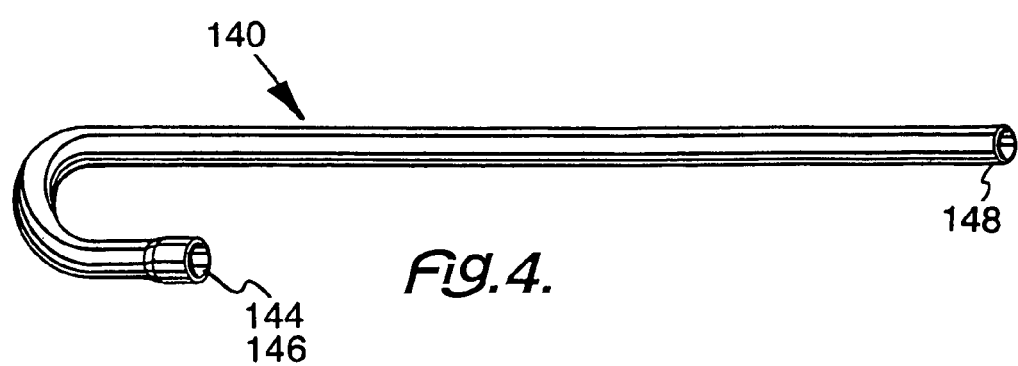
FIG. 4 depicts a perspective view of the swedged arced pipe 140 of FIG. 3.

Considering now FIG. 3 and FIG. 4, swedged pipe assembly 120 repairs furnace 112, by replacing cut sections of original pipe 116 of heat exchanger 110 with swedged arced pipe 140 having a length sufficient to fit there. FIG. 3 depicts a straight plain pipe 180 and a full swedged area 122.

Figure 5:
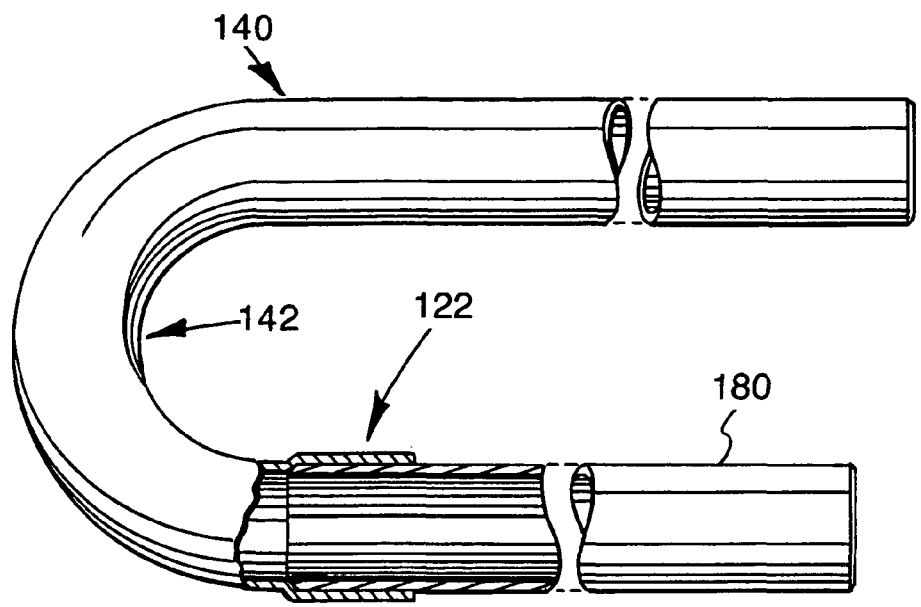
FIG. 5 depicts a partially cross-sectioned side view of the swedged pipe assembly 120 of FIG. 3 showing a full swedged area 122.
Figure 6:
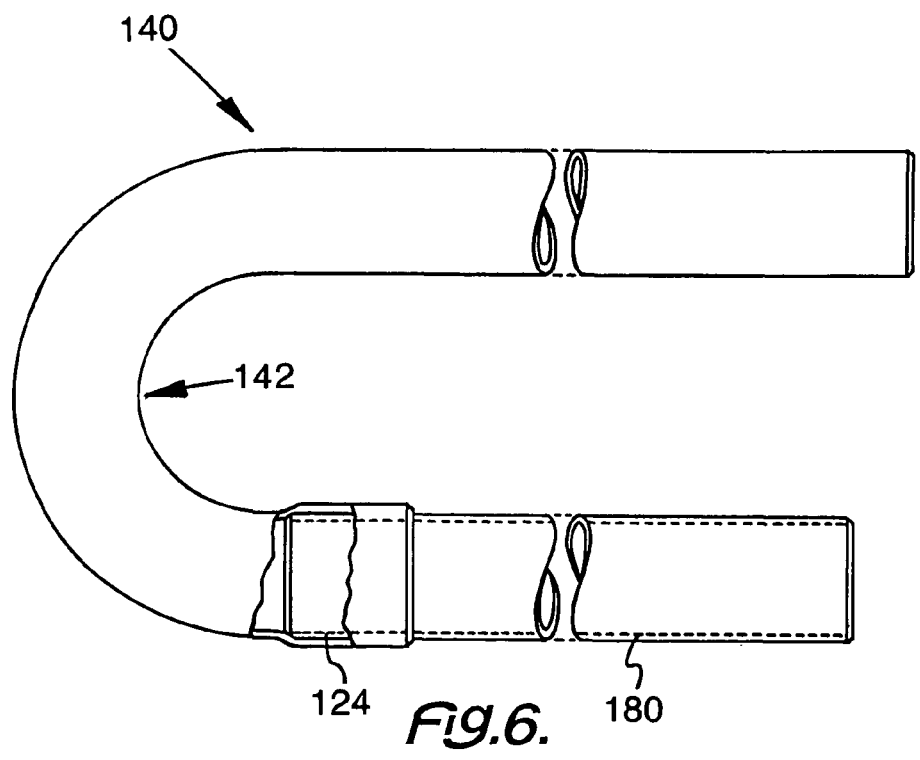
FIG. 6 depicts a partially cross-sectioned side view of the swedged pipe assembly 120 of FIG. 3 showing a partially swedged area 124.

Adding FIG. 5 and FIG. 6 to the consideration swedged arced pipe 140 has an arced end 142 (See FIG. 5), preferably of 180 degrees with an enlarged or arced swedged end 144 (See FIG. 7) adjacent to arced end 142. Arced swedged end 144 is expanded so that its inside diameter 146 is sufficient to receive a plain pipe end 148 (See FIG. 4), the arced swedged end 144 forming the female portion of the male-to-female relationship, with the plain pipe end 148 as the male portion. The full swedged area 122 receives straight plain pipe 180. The fitting is tight enough to be secured by welding or other appropriate action. In FIG. 5 full swedged area 122 with a complete insertion is shown. Swedged arced pipe 140 is the length of arced swedged end 144 longer than the removed part 118 (shown in FIG. 11) of original pipe 116.

Referring specifically to FIG. 6, partially swedged area 124 can be clearly seen. Partially swedged area 124 is a cut away perspective, of a full swedged area 122, as depicted as 122 in FIG. 5.

Figure 7:
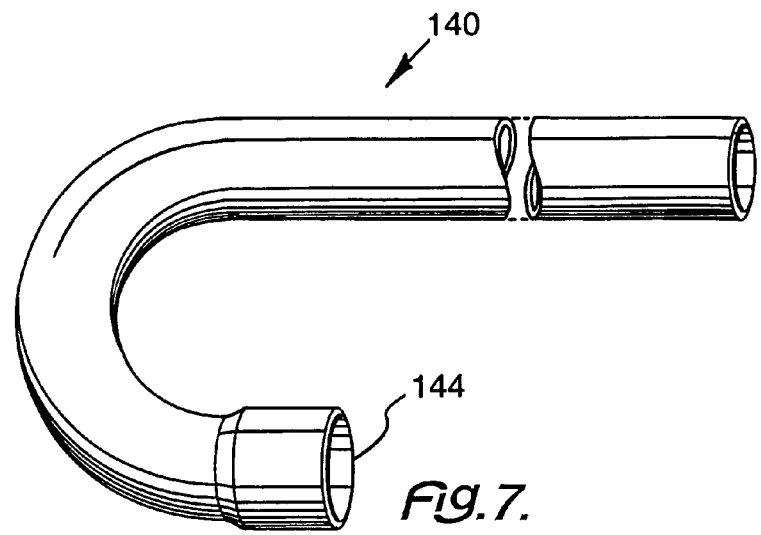
FIG. 7 depicts a side view of a swedged arced pipe 140 for use in the swedged pipe assembly 120 of FIG. 3.
Figure 8:
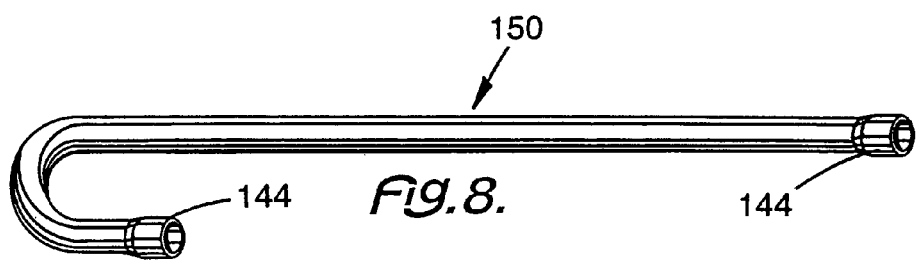
FIG. 8 depicts a side, perspective view of a double swedged arced pipe 150 for use in the swedged pipe assembly 120.

With FIG. 7 and FIG. 8, single swedged arced pipe 140 can have either one or both ends swedged to form double swedged arced pipe 150. So there may be an arced swedged end 144 or a straight plain end 180, or both. Likewise both ends may be plain, so long as adjoining end is swedged.

Figure 9:
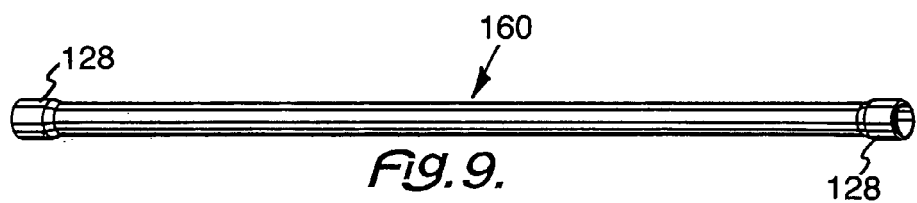
FIG. 9 depicts a side view of a double swedged straight pipe 160 for use in the swedged pipe assembly 120.
Figure 10:
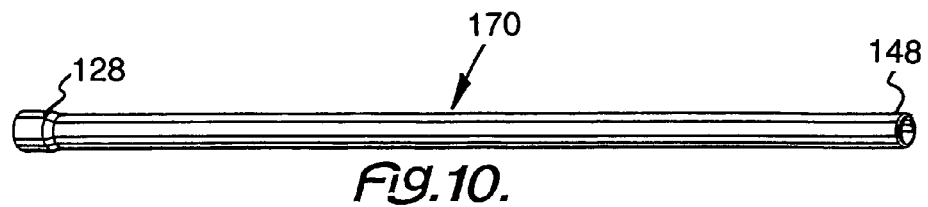
FIG. 10 depicts a side view of a single swedged straight pipe 170 for use in the swedged pipe assembly 120.

With FIG. 9 and FIG. 10, double swedged straight pipe 160 and single swedged straight pipe 170 are depicted. So there may be one swedged end, two swedged ends, or two plain ends 180 (see FIG. 3). Both ends may be plain, so long as an adjoining end is swedged. In FIG. 9, there are two straight swedged ends 128 present. In FIG. 10, there is one straight swedged end present. Plain pipe end 148 can be seen since there is only one straight swedged end 128 present.

Figure 11:
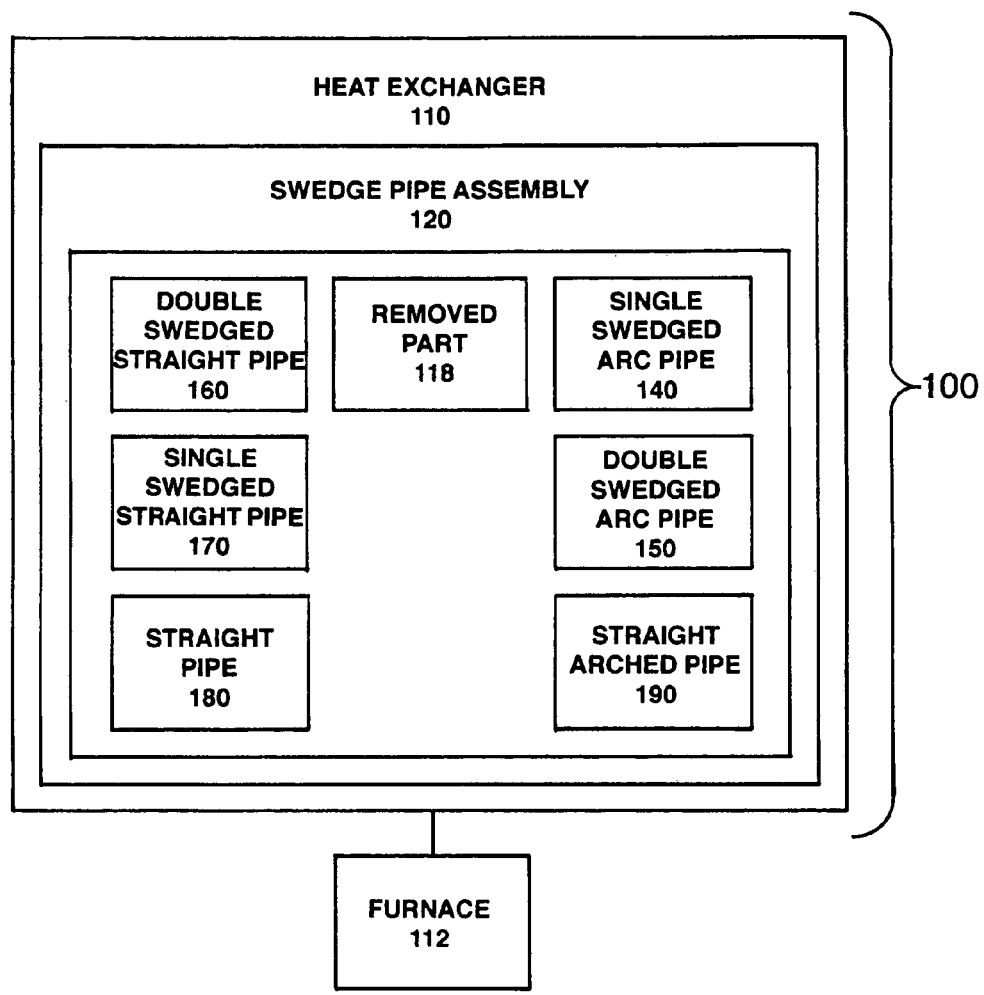
FIG. 11 depicts a block diagram of swedged pipe assembly 20.

Turning now to FIG. 11, the swedge pipe assembly 120 can clearly be seen (See also FIG. 3). Single swedged arced pipe 140, double swedged arced pipe 150, double swedged straight pipe 160, single swedged straight pipe 170, straight plain pipe 180 with a straight pipe end 148 (See FIG. 10), and straight arced pipe 190, are depicted. Double means two swedged ends. Single means one swedged end. Straight means no arced ends. A plain end can fit into any swedged end. Double swedged means two opposing plain ends can be received. The assembly for removed pipe 118 of heat exchanger 110 for furnace 112 can be formed in any manner by furnace repair device 100.

This application—taken as a whole with the abstract, specification, claims, and drawings—provides sufficient information for a person having ordinary skill in the art to practice the invention disclosed and claimed herein. Any measures necessary to practice this invention are well within the skill of a person having ordinary skill in this art after that person has made a careful study of this disclosure.

Because of this disclosure and solely because of this disclosure, modification of this tool can become clear to a person having ordinary skill in this particular art. Such modifications are clearly covered by this disclosure.

What is claimed and sought to be protected by Letters Patent is:

1. A method for repairing a heat exchanger of a furnace, the heat exchanger having a cracked pipe, comprising:
   a) providing a heat exchanger repair kit;
   b) the repair kit comprising at least one repair pipe having two ends;
   c) the at least one repair pipe comprising at least one arced repair pipe having one straight end and one arced end;
   d) locating at least one crack in a section of the cracked pipe, wherein the cracked pipe includes at least one cracked arced pipe section;
   e) removing the cracked section from the cracked pipe, wherein the cracked section being removed includes at least one cracked arced pipe section;

f) determining a combination of at least two of the at least one repair pipe for replacing the removed cracked section, wherein the combination of the at least two repair pipes would be of a sufficient length, shape and strength to replace the removed cracked section;

g) assembling the combination of the at least two repair pipes on-site of the furnace to form a combined repair pipe, wherein at least one repair pipe in the combined repair pipe is an arced pipe section; and h) replacing the removed cracked section with the combined repair pipe.

2. The method of claim 1, wherein:

a) removing the cracked pipe section from the cracked pipe produces at least one removed section and at least one remaining section, with each remaining section having a remaining plain end formerly attached to the removed section;

b) the combined repair pipe has at least one swedged end for each the remaining plain ends of the remaining sections; and c) the at least one swedged end of the combined repair pipe permits engagement of the combined repair pipe with the remaining plain end of the remaining section in female to male relationship.

3. The method of claim 2, wherein:

a) the arced repair pipe is selected from a group consisting of: an arced repair pipe with no swedged ends, an arced repair pipe with one swedged end, and an arced repair pipe with two swedged ends.

4. The method of claim 3, wherein:

a) the cracked pipe includes at least one cracked straight pipe section; and b) the repair kit comprises at least one straight repair pipe selected from a group consisting of: a straight repair pipe with no swedged ends, a straight repair pipe with one swedged end, and a straight repair pipe with two swedged ends.

5. The method of claim 4, wherein the step of determining a combination of at least two of the at least one repair pipe for replacing the removed cracked section further comprises:

a) determining a number of cracked arced pipe sections which are being removed;

b) selecting an arced repair pipe to replace each cracked arced pipe section which is being removed, wherein the arced repair pipe is selected from the group consisting of: an arced repair pipe with no swedged ends, an arced repair pipe with one swedged end, and an arced repair pipe with two swedged ends;

c) determining a number of cracked straight pipe sections which are being removed;

d) selecting a straight repair pipe to replace each cracked straight pipe section which will be removed, wherein the straight repair pipe is selected from the group consisting of: a straight repair pipe with no swedged ends, a straight repair pipe with one swedged end, and a straight repair pipe with two swedged ends;

e) whereby the selection of the arced repair pipes and the straight repair pipes allows for a sufficient combinations of swedged ends and plain ends to interface with the remaining plain ends of all remaining sections of the cracked pipe; and f) whereby the selection of the arced repair pipes and the straight repair pipes allows for sufficient combinations of swedged ends and plain ends to interface all individual repair pipes within the combined repair pipe.

* * * * *